(12) United States Patent
Berkeman

(10) Patent No.: US 7,318,080 B2
(45) Date of Patent: Jan. 8, 2008

(54) SPLIT RADIX MULTIPLICATION

(75) Inventor: Anders Berkeman, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 712 days.

(21) Appl. No.: 10/701,634

(22) Filed: Nov. 6, 2003

(65) Prior Publication Data

US 2005/0102344 A1    May 12, 2005

(51) Int. Cl.
*G06F 7/52* (2006.01)

(52) U.S. Cl. ..................................... 708/625

(58) Field of Classification Search ............... 708/620, 708/625

See application file for complete search history.

(56) References Cited

U.S. PATENT DOCUMENTS

| | | | |
|---|---|---|---|
| 3,777,130 A | | 12/1973 | Croisier et al. |
| 4,965,762 A | | 10/1990 | Williams |
| 5,200,912 A | | 4/1993 | Asgher et al. |
| 5,442,799 A | * | 8/1995 | Murakami et al. ............ 712/36 |
| 5,586,070 A | * | 12/1996 | Purcell ........................ 708/620 |
| 5,751,622 A | * | 5/1998 | Purcell ........................ 708/625 |
| 5,764,558 A | * | 6/1998 | Pearson et al. ............. 708/625 |
| 5,999,959 A | * | 12/1999 | Weng et al. ................. 708/492 |
| 6,286,024 B1 | * | 9/2001 | Yano et al. .................. 708/625 |
| 6,523,055 B1 | * | 2/2003 | Yu et al. ...................... 708/603 |
| 6,915,322 B2 | * | 7/2005 | Hong ........................... 708/625 |
| 7,062,526 B1 | * | 6/2006 | Hoyle .......................... 708/620 |
| 7,111,155 B1 | * | 9/2006 | Anderson et al. ........... 712/225 |
| 2003/0018678 A1 | | 1/2003 | Matula et al. |

FOREIGN PATENT DOCUMENTS

WO    WO 01/76131 A1    10/2001

OTHER PUBLICATIONS

Booth, A.D., "A signed binary multiplication technique," *Quarterly Journal of Mechanics and Applied Mathematics*, vol. 4, pp. 236-240, 1951.

Rubinfield, L.P., "A proof of the modified Booth algorithm for multiplication," *IEEE Transactions on Computers*, Oct. 1975.

Wallace, C., "A suggestion for a fast multiplier," *IEEE Transactions on Electronic Computers*, vol. EC-13, Feb. 1964.

(Continued)

*Primary Examiner*—Tan V. Mai
(74) *Attorney, Agent, or Firm*—Potomac Patent Group PLLC

(57) ABSTRACT

A first number is multiplied by a second number, by representing the first number as a first set of one or more W-bit wide numbers, and representing the second number as a second set of one or more W-bit wide numbers. Each of the W-bit wide numbers from the first set is paired with each of the W-bit wide numbers from the second set. For each pair of W-bit wide numbers, a set of sub-partial products is generated. Combinations of the sub-partial products are formed such that each combination is representable by a W-bit wide lower partial product and a carry out term that has fewer than W bits. The W-bit wide lower partial products and the carry out terms are combined to form the product of the first number and the second number. The carry out term is advantageously representable by $(W/2)+1$ bits.

13 Claims, 15 Drawing Sheets

OTHER PUBLICATIONS

Peled, A. and Liu, B., "A new hardware realization of digital filter," *IEEE Transactions on Acoustics, Speech, and Signal Processing*, vol. ASSP-22, No. 6, Dec. 1974.

Berkeman, A. et al., "A low logic depth complex mutliplier using distributed arithmetic," *IEEE Journal of Solid-State Circuits*, vol. 35, No. 4, pp. 656-659, Apr. 2000.

Berkeman, A. and Öwall, V., "Co-Optimization of FFT and FIR in a Delayless Acoustic Echo Canceller Implementation," *Proceedings of ISCAS 2000*, Geneva, Switzerland, May 2000.

Berkeman, A. and Öwall, V., "Efficient implementation of an FFT-FIR structure using a distributed arithmetic multiplier," submitted to *IEEE Transactions on Very Large Scale Integration (VLSI) Systems*.

Montgomery, P.L., "Modular multiplication without trial division," *Mathematics of Computation*, vol. 44, No. 170, pp. 519-521, Apr. 1985.

Dussé, S.R. and Kalinski, Jr., B.S., "A cryptographic library for the Motorola DSP56000," in *Eurocrypt*, 1990.

Wei, S. and Shimizu, K., "Residue Arithmetic Multiplier Based on the Radix-4 Signed-Digit Multiple-Valued Arithmetic Circuits" *Proceedings of 12th International Conference on VLSI Design*, pp. 212-217, Jan. 1999.

Argüello, F. and Zapata, E.L., "Constant Geometry Split-Radix Algorithms" *J. VLSI Signal Processing*, vol. 10, No. 2, Jul. 1995, pp. 117-126.

PCT International Search Report, dated Feb. 17, 2005, in connection with International Application No. PCT/EP2004/012366.

PCT Written Opinion, dated Feb. 17, 2005, in connection with International Application No. PCT/EP2004/012366.

Chang, Y-N et al., "Design and Implementation of Low-Power Digit-Serial Multipliers," *Proceedings of the International Conference on Computer Design. VLSI in Computers and Processors.* ICCD '97, Austin, TX, Oct. 12-15, 1997, Los Alamitos, CA. IEEE, US, Oct. 12, 1997, pp. 186-195, XP000799861.

Ashur, A.S. et al., "Systolic Digit-Serial Multiplier," *IEEE Proceedings: Circuits Devices and Systems, Institution of Electrical Engineers*, Stenvenage, GB, vol. 143, No. 1, Feb. 1, 1996, pp. 14-20, XP000556001.

* cited by examiner

SPLIT RADIX MULTIPLICATION

BACKGROUND

The present invention relates to automated multiplication, and more particularly to efficient automated multiplication that is especially well suited for multiplication of large numbers.

Hardware-implemented techniques for multiplying two numbers together are well known. In many processing system architectures, it is adequate to accomplish multiplication by iteratively instructing generic logic, such as an arithmetic logic unit (ALU), to perform suitable add and shift operations to generate the final product. However, it is often desirable to make available very fast multiplication operations, and to this end specialized multiplication logic is often provided. Such logic is often separate and apart from the central processing unit (CPU).

Hardware mapped multiplier units are very useful so long as the size (i.e., word length) of the input operands is comparable to size of the computational data paths for communicating those operands. However, in many applications (e.g., cryptographic algorithms) it is necessary to multiply together operands that are much larger than the size of the computational data path. In such cases, it is impractical to implement the desired multiplication using a hardware-mapped multiplication unit. Instead, one or both of the operands are broken up into parts, and the hardware data path is conventionally reused in a time-multiplexed fashion, operating on the parts, or words, of the input numbers. Hardware reuse is also the case for software implementation on standard microprocessors having a fixed word length data path.

The operation of carrying out a part of the multiplication for each word is denoted "partial product generation." In order to have a fast execution time, the number of iterations is minimized by using a large word length (also denoted "high radix") for the partial product generation. Unfortunately, higher radices imply longer carry chains and intermediate carry signals width larger word length, thereby slowing down operation and increasing power consumption. This can be seen from the following analysis:

A positive integer N-bit number a can then be written as a sequence of W-bit words $a_i$ as $$a = \sum_{i=0}^{N/W-1} a_i 2^{Wi}.$$

The generalization to negative and fractional numbers is straightforward, but not included in the calculations for the sake of simplicity. The multiplication of two words, x=ab may be calculated by generating partial products from the W-bit words $a_i$ and $b_j$, and combining the partial products. More specifically, the product x may be calculated according to $$x = \sum_{i=0}^{N/W-1} \sum_{j=0}^{N/W-1} a_i b_j 2^{W(i+j)},$$

where the partial product, $x_{i,j}$ is generated from two W-bit numbers, $a_i$ and $b_j$ as $$x_{i,j} = a_i b_j.$$

For a word length W, the partial products are simply calculated as W×W multiplications as indicated in the equation above. To calculate the complete product x=ab, all partial products are generated and added together according to their significance.

One partial product slice 101 is shown in FIG. 1. The rhombic shape is due to the significance of each of the partial product bits; significance increases when going from right to left in the figure. FIG. 2 is a diagram depicting how all of the required partial products are mathematically combined to generate the complete product. It is apparent from the figure that the computed result from one slice should be combined with the result from the neighboring slices to the left and right, and that these combination results are also accumulated with the values generated by the slices above and below.

The partial product $x_{i,j}$ is 2W bits wide, and is conventionally divided into two W-bit wide words, herein denoted carry ($c_{i,j}$) and lower partial product ($p_{i,j}$), as $$x_{i,j} = 2^W c_{i,j} + p_{i,j},$$

or $$c_{i,j} = \text{int}(x_{i,j}/2^W) \text{ and } p_{i,j} = x_{i,j} \bmod 2^W,$$

where "int( )" is a function that generates the integer part of a number, and "mod n" indicates modulo n arithmetic.

Assume that it is desired to multiply two large numbers A and B, each of word length N, stored in a memory of word length W. Then, each number consists of N/W words (assuming that W is a factor of N). Let T be a storage area of 2N bits, or equivalently 2N/W words denoted $t_0, t_1, \ldots, t_{(2N/W)-1}$. T is used as a working storage area in which carry and lower partial product terms are accumulated until the final product, x, is generated. The final values for $t_0, t_1, \ldots, t_{(2N/W)-1}$ are efficiently generated from carry terms, previously-generated lower partial products, and interim values of $t_0, t_1, \ldots, t_{(2N/W)-1}$ as follows (where the symbol ": =" denotes a processing operation whereby already-existing ("old") values of terms are combined as indicated on the right side of the symbol, with the result being assigned to the indicated "new" term on the left side of the symbol):

$$t_0 := p_{0,0}$$
$$t_1 := c_{0,0} + p_{1,0}$$
$$t_2 := c_{1,0} + p_{2,0}$$
$$\vdots$$
$$t_1 := t_1 + p_{0,1}$$
$$t_2 := t_2 + c_{0,1} + p_{1,1}$$
$$t_3 := t_3 + c_{1,1} + p_{2,1}$$
$$\vdots$$

That is, operations take place in a right-to-left, top to bottom order, starting with the horizontal direction first as illustrated in FIG. 3. For example, in FIG. 3 it can be seen that the word $b_0$ is first applied against each of the words $a_0 \ldots a_{(N/W)-1}$ to generate corresponding lower partial products $p_{0,0} \ldots p_{(N/W)-1,(N/W)-1}$, carry terms $c_{0,0} \ldots c_{(N/W)-1,(N/W)-1}$, and words $t_0 \ldots t_{(N/W)-1}$ before the next word $b_1$ is applied against the words $a_0 \ldots a_{(N/W)-1}$, and so on.

FIG. 4 is a logic diagram illustrating conventional logic of an exemplary row 301 for implementing multiplication as illustrated in FIG. 3. The first row 303 can be considered a special case in which the values of $t_0 \ldots t_{(N/W)-1}$ have each been initialized to zero. If the first row 303 is physically implemented by logic as depicted in FIG. 4, it can be efficiently realized by merely omitting the tk inputs from each indicated adder (k=0 ... (N/W)−1).

FIG. 5 is a logic diagram of a generic one of the conventional partial product generators illustrated in FIG. 4. Mathematically, the outputs from the partial product generator are related to the inputs as follows:

$$2^W c_{OUT} + t_{NEW} = t_{OLD} + p_{i,j} + c_{IN},$$

where $P_{i,j}$ is a lower partial product. (It will be noted that, in order to ease the notational burden in this description, the carry term supplied to a partial product generator is henceforth referred to as "$c_{IN}$", and the carry term provided as an output from the partial product generator is henceforth referred to as "$c_{OUT}$".) While $t_{NEW}$ and $t_{OLD}$ may be maintained separately, in practical embodiments it is often most efficient to maintain a single value of t in storage, with $t_{OLD}$ being the value read out of storage, and $t_{NEW}$ being the value to be written back.

It will now be shown how this expression can be used to derive the minimum word length of the carry signal. Since $p_{i,j} = a_i b_j$, and $a_i, b_j \leq 2^W - 1$, it follows that:

$$p_{i,j} \leq (2^W - 1)^2.$$

Furthermore, the word length of t is W bits, and thus $t \leq 2^W - 1$. Thus, if we collect the carry terms on the left side of the relationship, and collect the t terms on the right side of the relationship, we find that $$2^W c_{OUT} - c_{IN} = t_{OLD} - t_{NEW} + P_{i,j}.$$

The right side of the equation can be set to its maximum value by letting $t_{NEW}$ be set to zero (i.e., its minimum value), and by letting $t_{OLD}$ and $p_{i,j}$ each be set to their respective maximum values. This yields the following relationship:

$$2^W c_{OUT} - c_{IN} \leq (2^W - 1) + (2^W - 1)^2$$
$$= 2^W (2^W - 1)$$

Since $c_{IN}$ is, by definition, greater than or equal to zero, and since the relationship must be true for all values of $c_{IN}$ (i.e., including $c_{IN} = 0$), it can be concluded that $c_{OUT} \leq (2^W - 1)$. Furthermore, the word length of the carry in signal is the same as the carry out signal. Therefore, $$c_{IN}, c_{OUT} \leq 2^W - 1.$$

From the previous discussion, two statements can be made regarding the shown radix-$2^W$ approach:

1. All data words, including carry signals, are W bits wide.
2. The carry propagate chain for the radix-$2^W$ partial product generator approach is 2W bits long.

The length of the carry propagate chain sets the upper limit on the speed of a partial product generator implementation, and the size of the propagated carry sets the limit on the maximum required word length of the data path.

It is common to increase multiplication speed by using modified Booth encoding, Wallace adders to compress the number of partial products, and faster addition schemes for carry propagation summation. Booth encoding is discussed in A. D. Booth, "A signed binary multiplication technique," *Quarterly Journal of Mechanics and Applied Mathematics*, vol. 4, pp. 236-240, 1951; and in L. P. Rubinfield, "A proof of the modified Booth algorithm for multiplication," *IEEE Transactions on Computers*, October 1975, both of which are hereby incorporated herein by reference. Wallace adders are discussed in C. Wallace, "A suggestion for a fast multiplier," *IEEE Transactions on Electronic Computers*, vol. EC-13, February 1964, which is hereby incorporated herein by reference.

The choice of radix for the partial product generation implementation depends on a number of factors, mainly including constraints on clock frequency, area, available data word length, and latency. To have a fast and area-efficient partial product generation, the word length, or radix, has to be limited. A restricted word length results in a larger number of partial products, which takes more time to add together when producing the full word length product. Thus, the choice of a radix for the partial product generator results in a sub-optimal solution.

The use of Booth encoding, or other means to speed up partial product generation, may speed up calculation of the actual partial product, but the word length of the intermediate carry signal remains the same, thus not improving the time required for addition of the partial products.

It is therefore desirable to provide improved methods and apparatuses for multiplying large numbers together.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods, apparatuses and computer readable storage media for multiplying a first number by a second number, where the first number is represented as a first set of one or more W-bit wide numbers, and the second number is represented as a second set of one or more W-bit wide numbers. In accordance with an aspect of the invention, each of the W-bit wide numbers from the first set is paired with each of the W-bit wide numbers from the second set. For each pair of W-bit wide numbers, a set of sub-partial products is generated. Combinations of the sub-partial products are formed such that each combination is representable by a W-bit wide lower partial product and a carry out term that has fewer than W bits. The W-bit wide lower partial products and the carry out terms are combined to form the product of the first number and the second number. In some embodiments, each of the carry out terms is representable by (W/2)+1 bits.

In one aspect, the first number is representable by N bits, $N \geq 0$; the second number is representable by M bits, $M \geq 0$; for each pair of W-bit wide numbers, $(a_i, b_j)$, $$a_i = a_i^H 2^{W/2} + a_i^L \text{ and } b_j = b_j^H 2^{W/2} + b_j^L,$$

where $a_i^H$, $a_i^L$, $b_j^H$, $b_j^L$ are each W/2-bit wide numbers, $0 \leq i \leq N/W - 1$, a $0 \leq j \leq M/W - 1$. In some embodiments, each of the combinations of the sub-partial products is formed in accordance with:

$$2^W c_{OUT} + p_i = a_i^L b_j^L + a_{i-1}^H b_j^H + 2^{W/2}(a_i^H b_j^L + a_i^L b_j^H) + c_{IN},$$

where $p_i$ is a W-bit wide lower partial product, $c_{IN}$ is a (W/2)+1 bit wide carry-in term, $c_{OUT}$ is a (W/2)+1 bit wide carry-out term, and $a_{i-1}^H = 0$ when i=0.

In alternative embodiments, each of the combinations of the sub-partial products is formed in accordance with:

$$2^W c_{OUT} + t_{NEW} = t_{OLD} + a_i^L b_j^L + _{i-1}^H b_j^H + 2^{W/2}(a_i^H b_j^L + a_i^L b_j^H) + c_{IN}$$

where $t_{OLD}$ is a W-bit wide term representing an accumulation of previously generated lower partial products and carry terms, $t_{NEW}$ is a W-bit wide term representing a new accumulation of previously and presently generated lower partial products and carry terms, $c_{IN}$ is a (W/2)+1 bit wide carry-in term, $c_{OUT}$ is a (W/2)+1 bit wide carry-out term, and $a_{i-1}^H = 0$ when i=0.

In yet another aspect of the invention, in either of these embodiments, offset binary coding is used to represent $a_i$; $b_j$ is represented in accordance with $$\begin{cases} b_j^\sigma = b_j^L + b_j^H \\ b_j^\delta = b_j^L - b_j^H \end{cases};$$

and the logic functions of bits of $a_i$ are used to select either $b_j^\sigma$ or $b_j^\delta$ in forming each of the combinations of the sub-partial products.

In still other aspects of the invention, methods, apparatuses and computer readable storage media are for generating a partial product that is for use in multiplying a first number by a second number, wherein the first number is represented as a first set of one or more W-bit wide numbers, and the second number is represented as a second set of one or more W-bit wide numbers. Such methods, apparatuses and computer readable storage media are based on receiving a first W-bit wide number from the first set of one or more W-bit wide numbers; and receiving a second W-bit wide number from the second set of one or more W-bit wide numbers. The first W-bit wide number and the second W-bit wide number are used to generate a set of sub-partial products. Combinations of the sub-partial products are formed such that each combination is representable by a W-bit wide lower partial product and a carry out term that has fewer than W bits.

In some of these embodiments, the carry out term is representable by (W/2)+1 bits.

The various embodiments of the invention may be used whenever multiplication is to be performed between two or more numbers. Because of the many advantageous properties presented by the invention (including those properties expressly stated herein as well as others that are immediately apparent to those skilled in the art), the invention is especially useful whenever large numbers are to be multiplied together. Of course, what constitutes a "large" number will vary from one application to another. In some applications, a number may be considered "large" if it is about 4 times the computational data path (e.g., 4096 bits used in cryptography). Thus, the invention may advantageously be applied in the field of cryptography, as well as many other fields. When used in cryptography, the invention may be used as part of a Montgomery multiplication process, or alternatively as a "stand-alone" process for multiplying two or more numbers together.

BRIEF DESCRIPTION OF THE DRAWINGS

The objects and advantages of the invention will be understood by reading the following detailed description in conjunction with the drawings in which.

DETAILED DESCRIPTION

Figure 1:
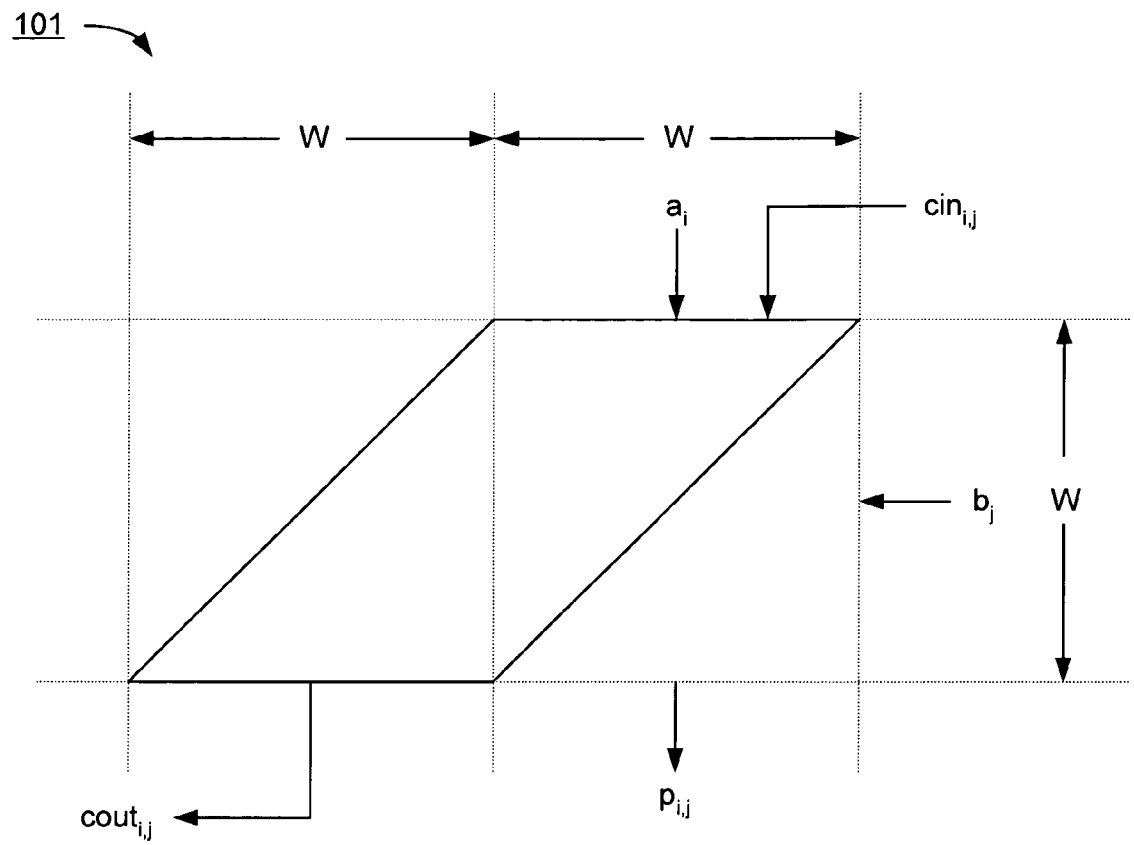
FIG. 1 is a diagram showing one partial product slice.
Figure 2:
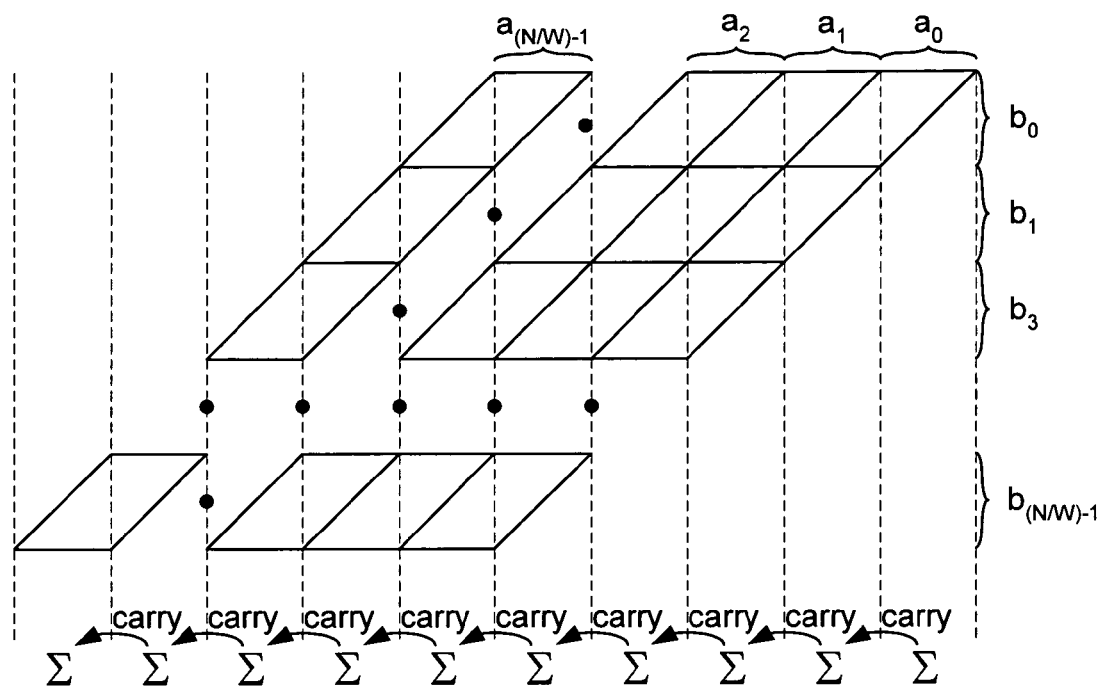
FIG. 2 is a diagram depicting how all of the required partial products are combined to generate a complete product.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

To overcome the problem of the sub-optimal radix selection, the techniques described herein use dual radices: one for the word length of the computational data path, and one for the calculations of the partial products. This is referred to herein as "split radix". Using dual radices helps reach a more optimal implementation: data is addressed with a larger word length, and arithmetic operations in the partial product generator are made with a smaller word length. As a result, the data bandwidth remains the same while arithmetic calculations become faster and more efficient.

Figure 6:
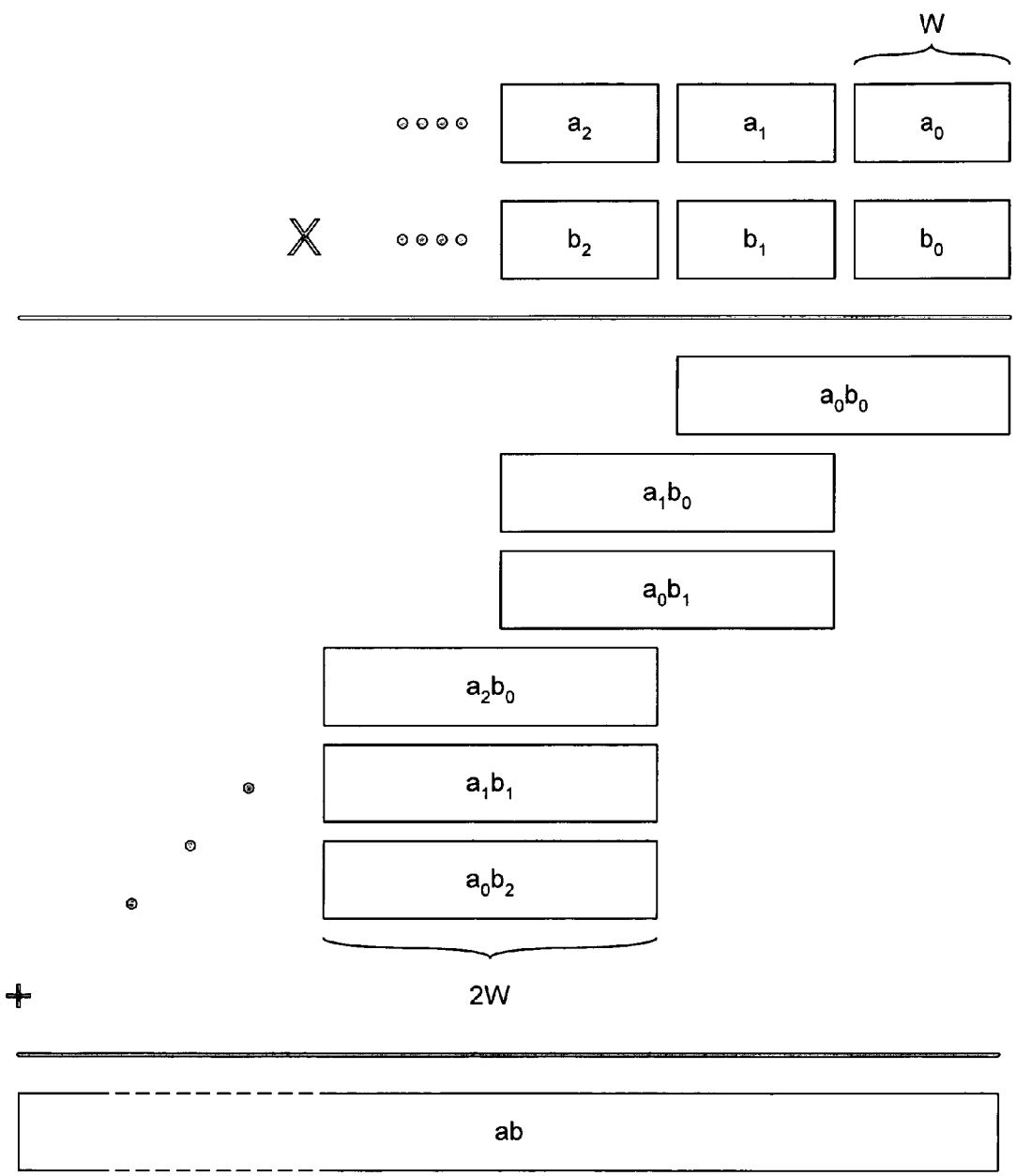
FIG. 6 illustrates a technique for multiplying two numbers together by breaking them up into numbers that are representable by fewer bits than the original two numbers, multiplying these numbers together to generate partial products, and then combining these partial products to generate the desired product.

To facilitate an understanding of the basis for the split radix design, consider FIG. 6, which illustrates partial products that are generated when multiplying together two operands, a and b. Assume that the lengths of a and b are each integer multiples of a word length W. (Even if they are not initially of such a length, their length could always be extended as necessary—for example by padding with zeroes or by sign extension—to force their lengths to be integer multiples of W.) As explained in the Background section, the N-bit number a can then be written as a sequence of W-bit words $a_i$ as $$a = \sum_{i=0}^{N/W-1} a_i 2^{Wi}.$$

Similarly, the M-bit number b can be written as a sequence of W-bit words $b_j$ as $$b = \sum_{j=0}^{M/W-1} b_j 2^{Wj}.$$

The multiplication of the two words, x=ab may be calculated by generating partial products from the W-bit words $a_i$ and $b_j$, and combining the partial products. More specifically, the product x may be calculated according to $$x = \sum_{i=0}^{N/W-1} \sum_{j=0}^{M/W-1} a_i b_j 2^{W(i+j)},$$

where the partial product, $x_{i,j}$ is generated from two W-bit numbers, $a_i$ and $b_j$ as $$x_{i,j} = a_i b_j.$$

Each of the partial products $x^{i,j}$ will be 2W bits long. In practical implementations, the multiplication by $2^{W(i+j)}$ is performed by aligning the partial product $x_{i,j}$ so that it has the proper significance when combined with other partial products. For example, the partial product $x_{i,j}$ may be left-shifted by W(i+j) bits (inserting "zeroes" as the fill bits) in order to accomplish the multiplication by $2^{W(i+j)}$.

This technique for multiplying two numbers together is illustrated in FIG. 6. Here it can be seen that a first partial product, $a_0b_0$, is generated by multiplying the two words $a_0$ and $b_0$ together. A next partial product $a_1b_0$ is generated by multiplying the two words $a_1$ and $b_0$ together. To effect multiplying the partial product $a_1b_0$ by $2^{W(0+1)}=2^W$, the partial product $a_1b_0$ is aligned W bits to the left of the first partial product $a_0b_0$. The remaining partial products are similarly generated and aligned, so that they may be summed to form the final product ab, as shown in the figure.

In accordance with one aspect of the invention, it is recognized that each of the W-bit by W-bit multiplies can itself be broken up into a series of W/2-bit by W/2-bit multiplies. Mathematically, what we have is $a_1 = a_i^H 2^{W/2} + a_i^L$ and $b_j = b_j^H 2^{w/2} + b_j^L$. The product $a_i b_j$ is then generated as $$a_i \times b_j = (a_i^H 2^{W/2} + a_i^L) \times (b_j^H 2^{W/2} + b_j^L)$$
$$= a_i^H b_j^H 2^W + (a_i^H b_j^L + a_i^L b_j^H) 2^{W/2} + a_i^L b_j^L$$

Figure 7:
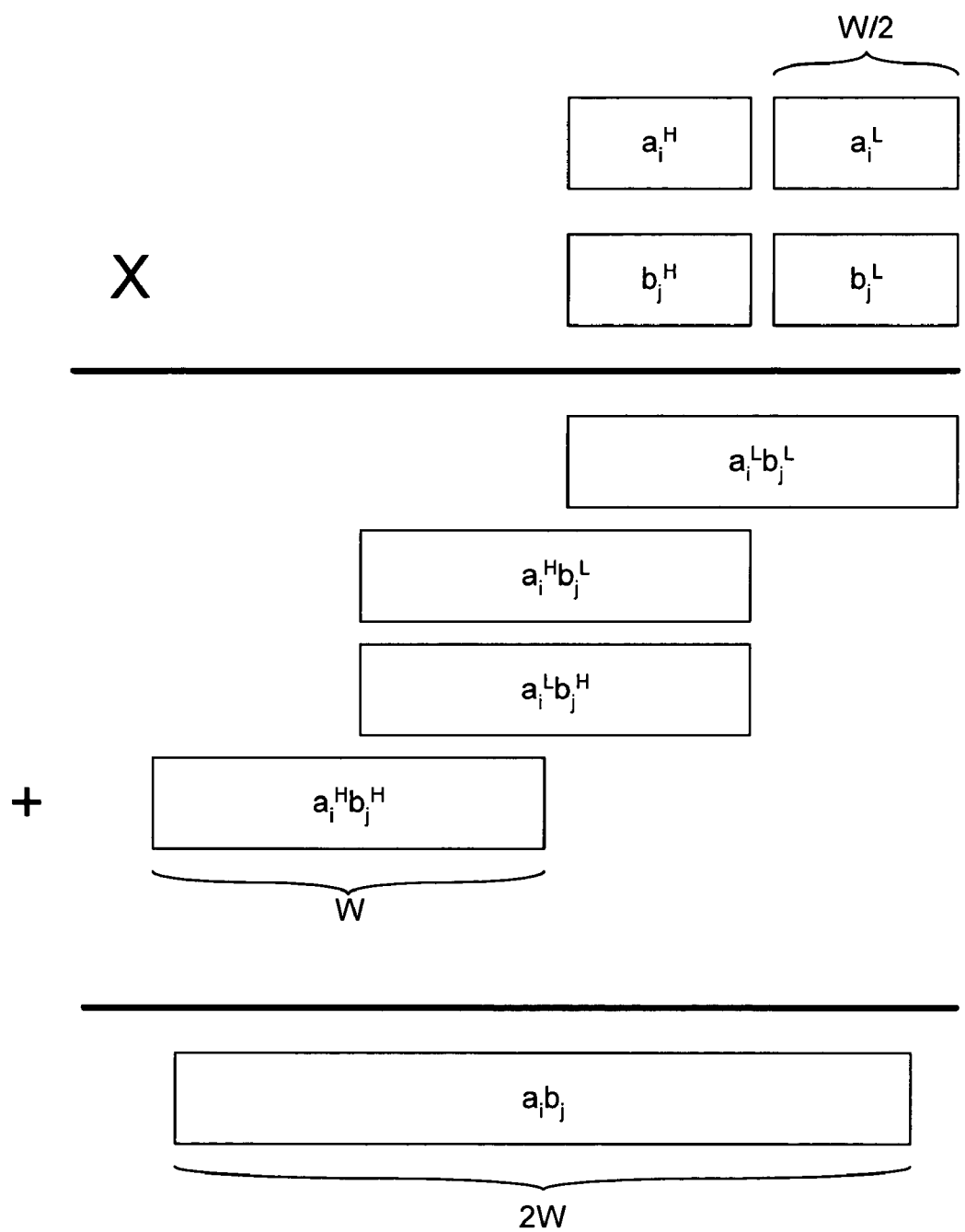
FIG. 7 is a diagram that illustrates a technique for generating the partial products of FIG. 6 by breaking up the numbers into other numbers representable by even fewer bits, multiplying these numbers together to generate other partial products, and then combining these other partial products together to generate the desired partial product.

FIG. 7 is a diagram that illustrates these partial products being generated and properly aligned to permit their sum to represent the product $a_i b_j$.

Figure 8:
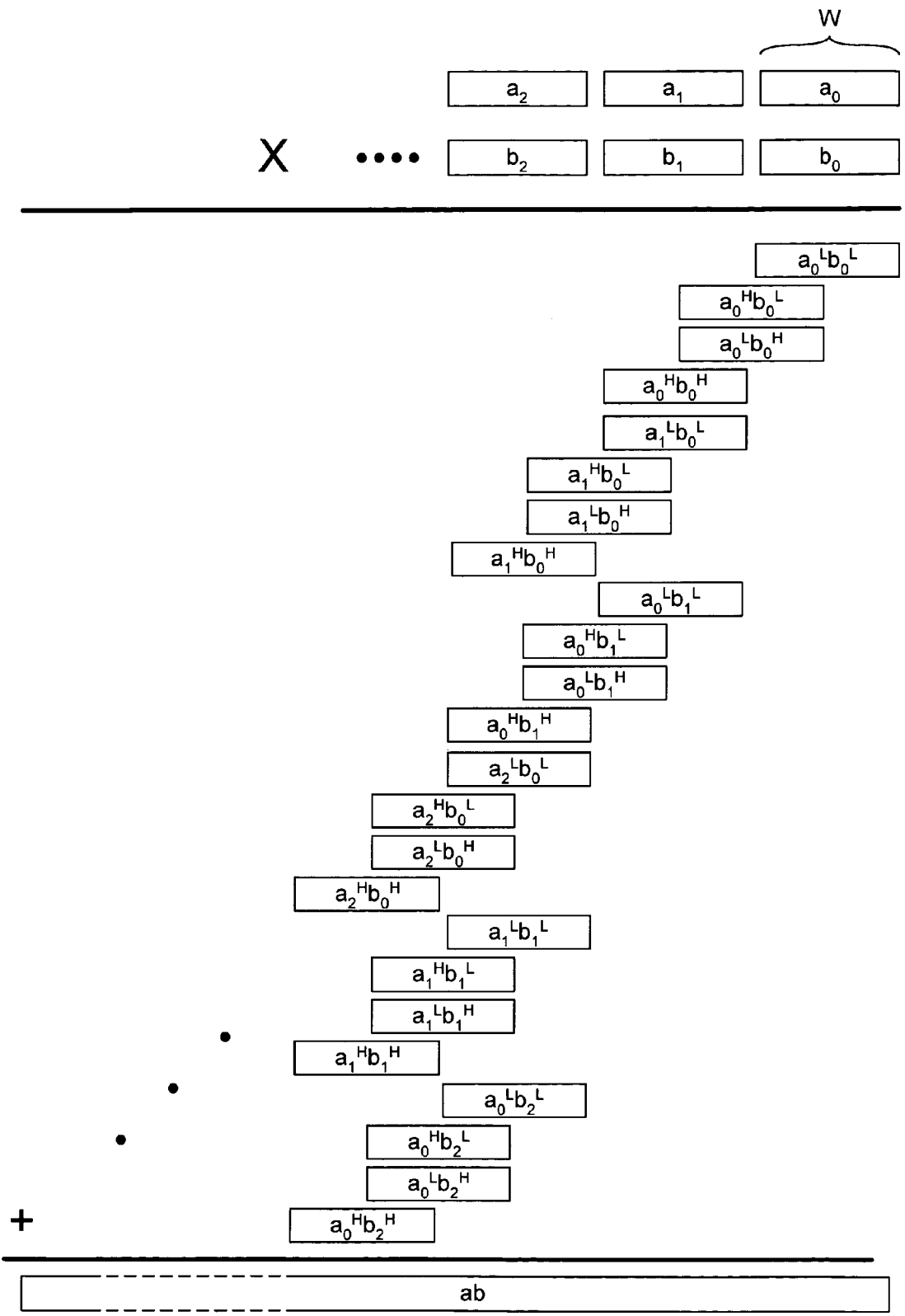
FIG. 8 is a diagram that illustrates, for the case of W/2-bit by W/2-bit multiplications, how the sub-partial products take the place of the partial products shown in FIG. 6.

In accordance with another aspect of the invention, each of the W-bit by W-bit multiplies illustrated in FIG. 6 can itself be broken up into a series of smaller multiplications, such as a series of W/2-bit by W/2-bit multiplies as illustrated in FIG. 7. This results in the generation of what are herein referred to as sub-partial products. For the case of W/2-bit by W/2-bit multiplies, FIG. 8 illustrates how the sub-partial products take the place of the partial products shown in FIG. 6.

Figure 9:
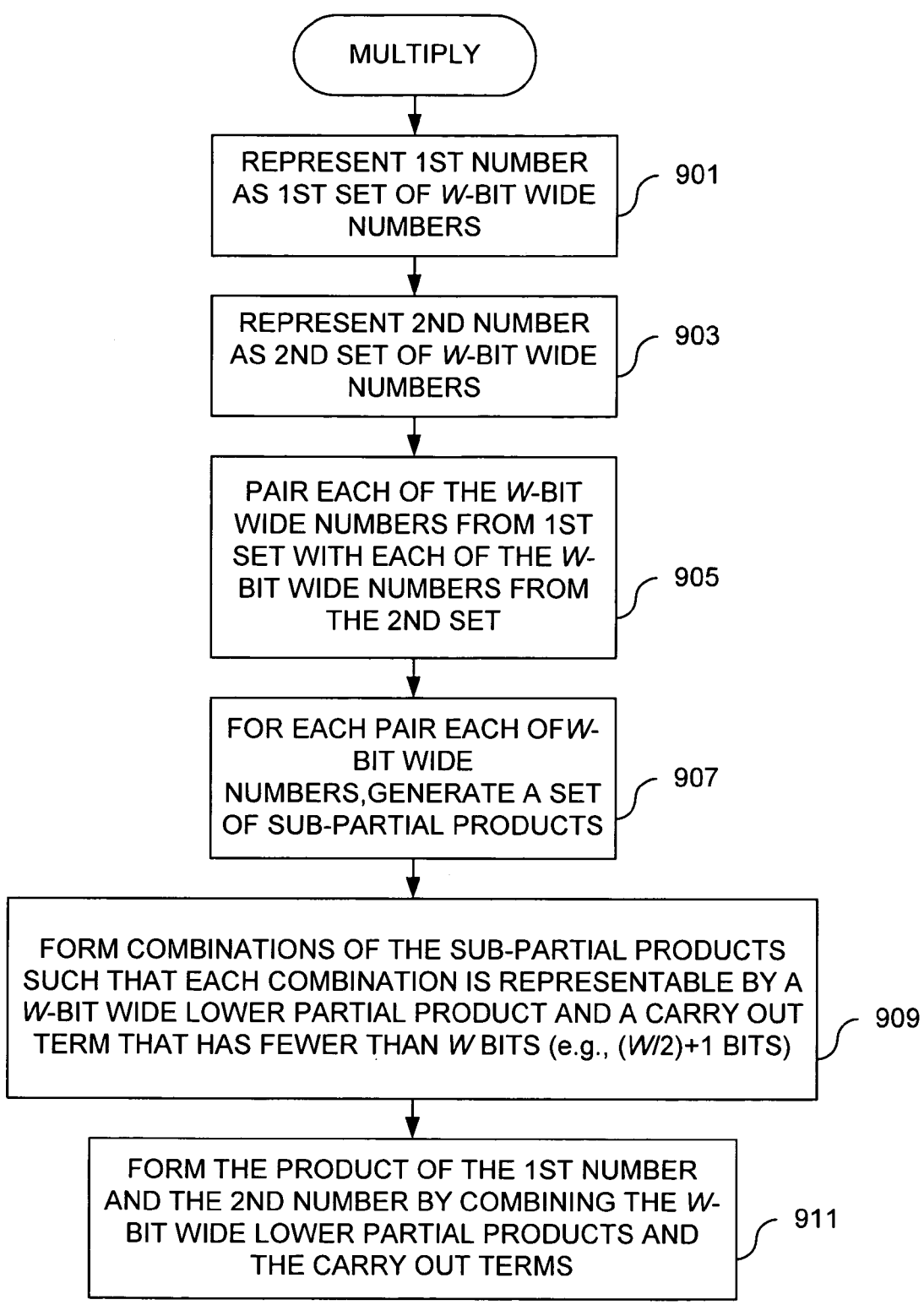
FIG. 9 is a flow diagram that illustrates the general case of the split-radix multiplication techniques described herein.

In the general case, the split-radix multiplication technique includes the steps illustrated in FIG. 9. To multiply a first number by a second number, the first number is represented as a first set of one or more W-bit wide numbers (step 901), and the second number is represented as a second set of one or more W-bit wide numbers (step 903). Each of the W-bit wide numbers from the first set is paired with each of the W-bit wide numbers from the second set (step 905). For each pair of W-bit wide numbers, a set of sub-partial products is generated (step 907). Combinations of the sub-partial products are formed such that each combination is representable by a W-bit wide lower partial product and a carry out term that has fewer than W bits (step 909). For example, when the sub-partial products are the result of performing W/2 by W/2-bit multiplications, the carry out terms are representable by (W/2)+1 bits. The W-bit wide lower partial products and the carry out terms are combined to form the product of the first number and the second number (step 911).

Figure 10:
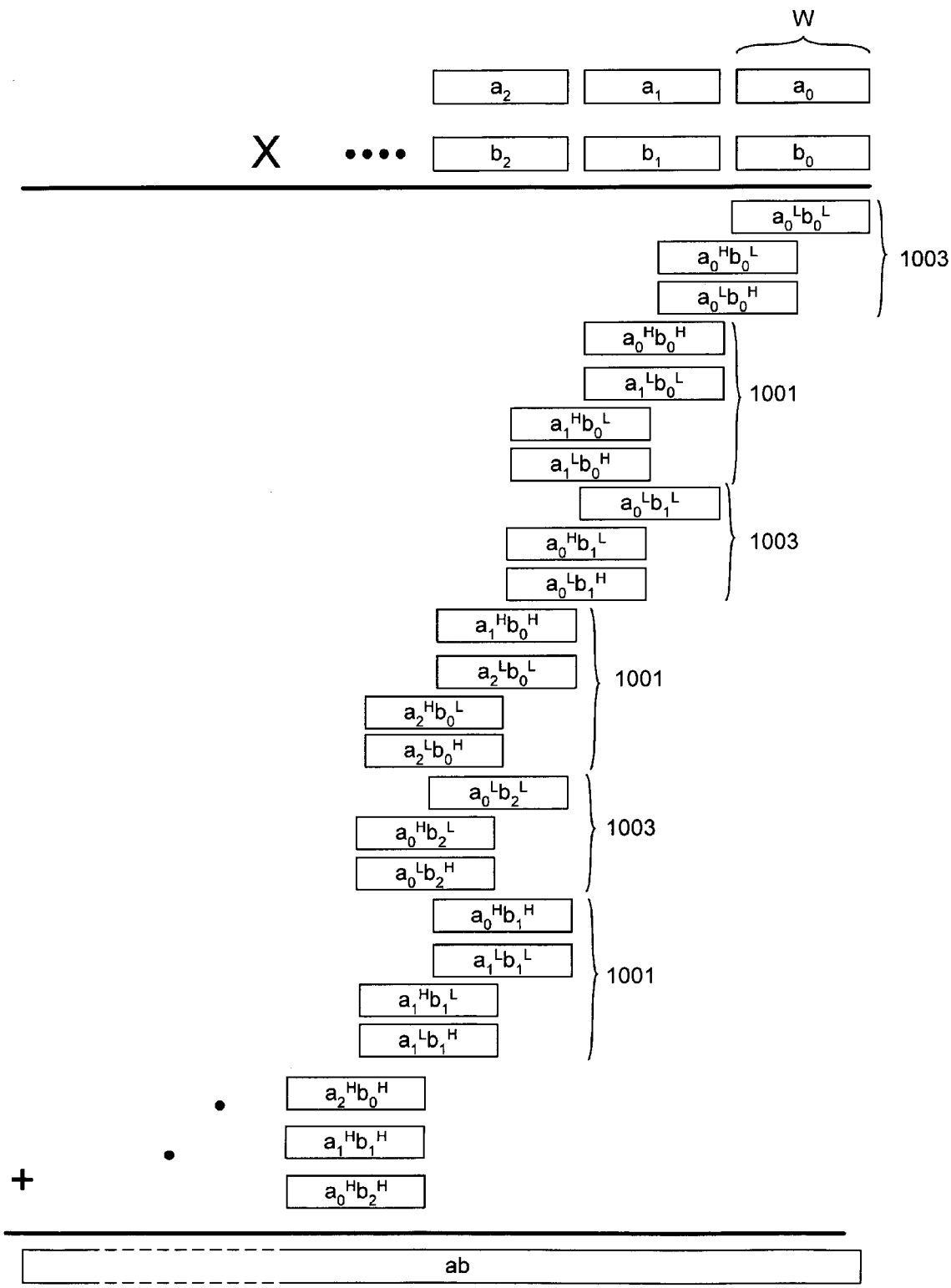
FIG. 10 illustrates how the sub-partial products generated from a W-bit by W-bit multiply may be advantageously grouped for the cases in which for each pair of W-bit wide numbers, a set of sub-partial products is generated by performing W/2 by W/2-bit multiplications.

In accordance with yet another aspect of the invention in which for each pair of W-bit wide numbers, a set of sub-partial products is generated by performing W/2 by W/2-bit multiplications, the sub-partial products generated from the W-bit by W-bit multiply may be advantageously grouped as illustrated in FIG. 10. Two types of groupings are illustrated: a first grouping type 1001 that involves the addition of four sub-partial products, and a second grouping type 1003 that involves the addition of only three sub-partial products. The second grouping type 1003 can be considered a special case of the first grouping type 1001, in which one of the four sub-partial products is always zero.

In some embodiments, a third grouping can also be constructed for use in the most-significant position of the partial product generation (e.g., the left-most position of a row of sub-partial product generators) in that fewer than four sub-partial products will need to be combined in this position. In many embodiments, it is advantageous simply to use enough ones of the first grouping type 1001 for the size of the product that it is intended to generate.

In accordance with an aspect of the invention, a new type of partial product generator (PPG) generates its outputs based on these groupings. In the general case, the new partial product generator receives $a_i$, $b_j$, $a^H_{i-1}$, a value t, and a carry-in value ($c_{in}$) as its input parameters (where i=0, . . . , L−1; and L=the number of W-bit words that make up the number a). The final values for $t_0$, $t_1$, . . . , $t_{(2N/W)-1}$ may be efficiently generated from carry terms, previously-generated lower partial products, and interim values of $t_0$, $t_1$, . . . , $t_{(2N/W)-1}$ in the manner previously described with respect to the conventional PPG, except that it will be recognized that different values will be obtained because the carry terms themselves will take on different values.

Like the conventional type PPG, the new PPG uses W-bit wide input operands (except for the carry-in operand, which is only $$\frac{W}{2}+1$$

bits wide). However, unlike the conventional type PPG, the new PPG generates an output that is, in total, $$\frac{3W}{2}+1$$

bits wide.

Figure 11:
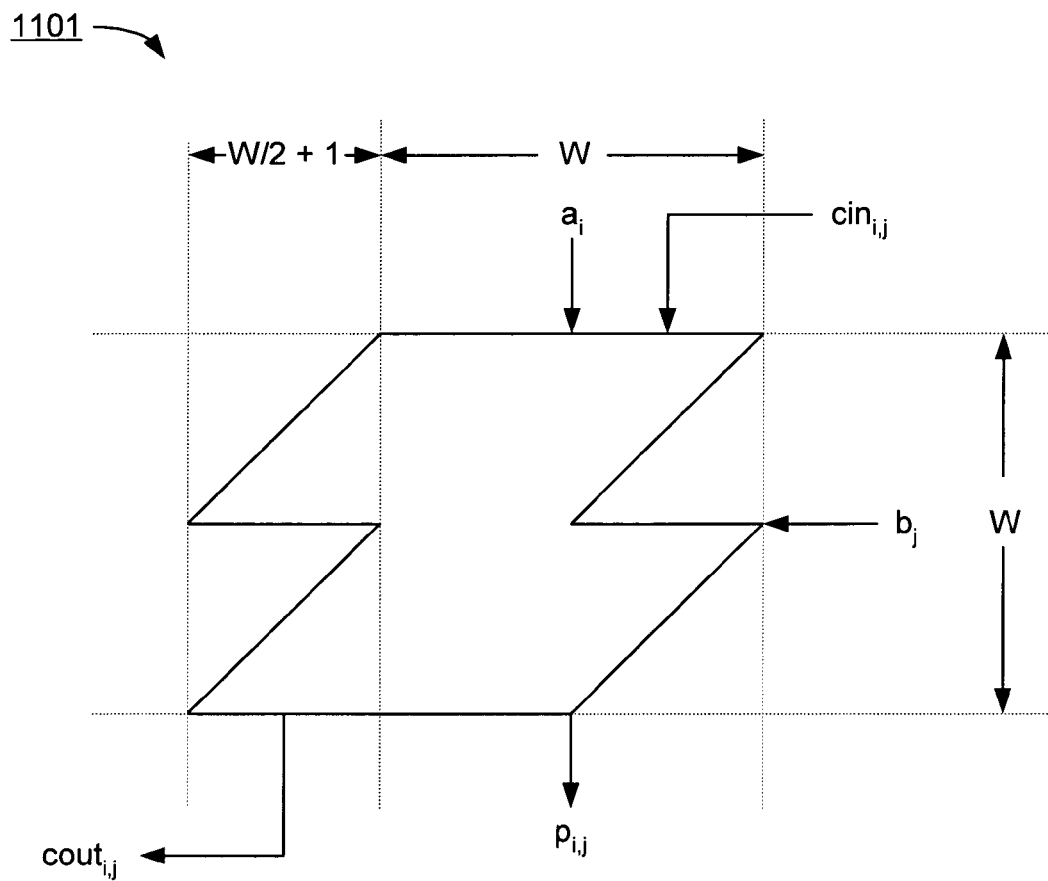
FIG. 11 is a block diagram of a new partial product generator based on the above-described groupings.

A new PPG 1101 based on the above-described groupings can be schematically depicted as in FIG. 11. Here it can be seen that the $a_i$ and $b_j$ inputs are only W-bits wide, and that the output from this new PPG 1101 is $$\frac{3W}{2}+1$$

bits wide. The shape depicted in FIG. 11 is representational of the significance of the four sub-partial products that are summed within the new PPG 1101.

In another aspect of the invention, the $$\frac{3W}{2}+1$$

bit wide output from the new PPG is divided into a W-bit wide lower partial product $p_{i,j}$ that is propagated in a vertical direction (i.e., combined with previously-generated and later-generated terms of like significance), and $$\frac{W}{2}+1$$

carry part $c_{i,j}$ that is propagated in the horizontal direction (i.e., to a term of higher significance).

Figure 3:
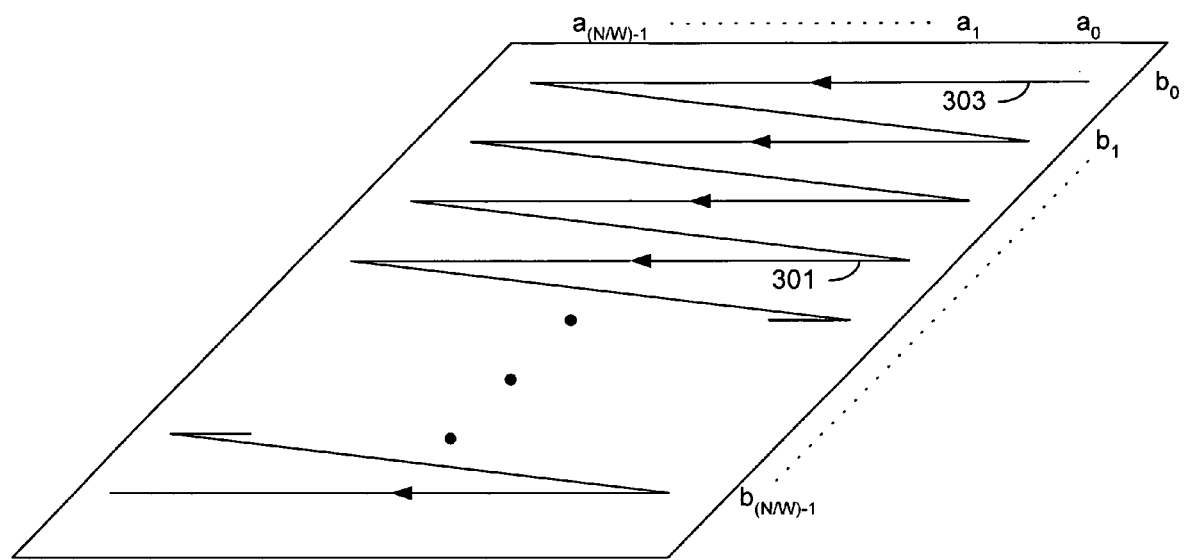
FIG. 3 is a diagram illustrating how outputs from partial product slices are combined in a right-to-left, top to bottom order, to generate a final product.
Figure 4:
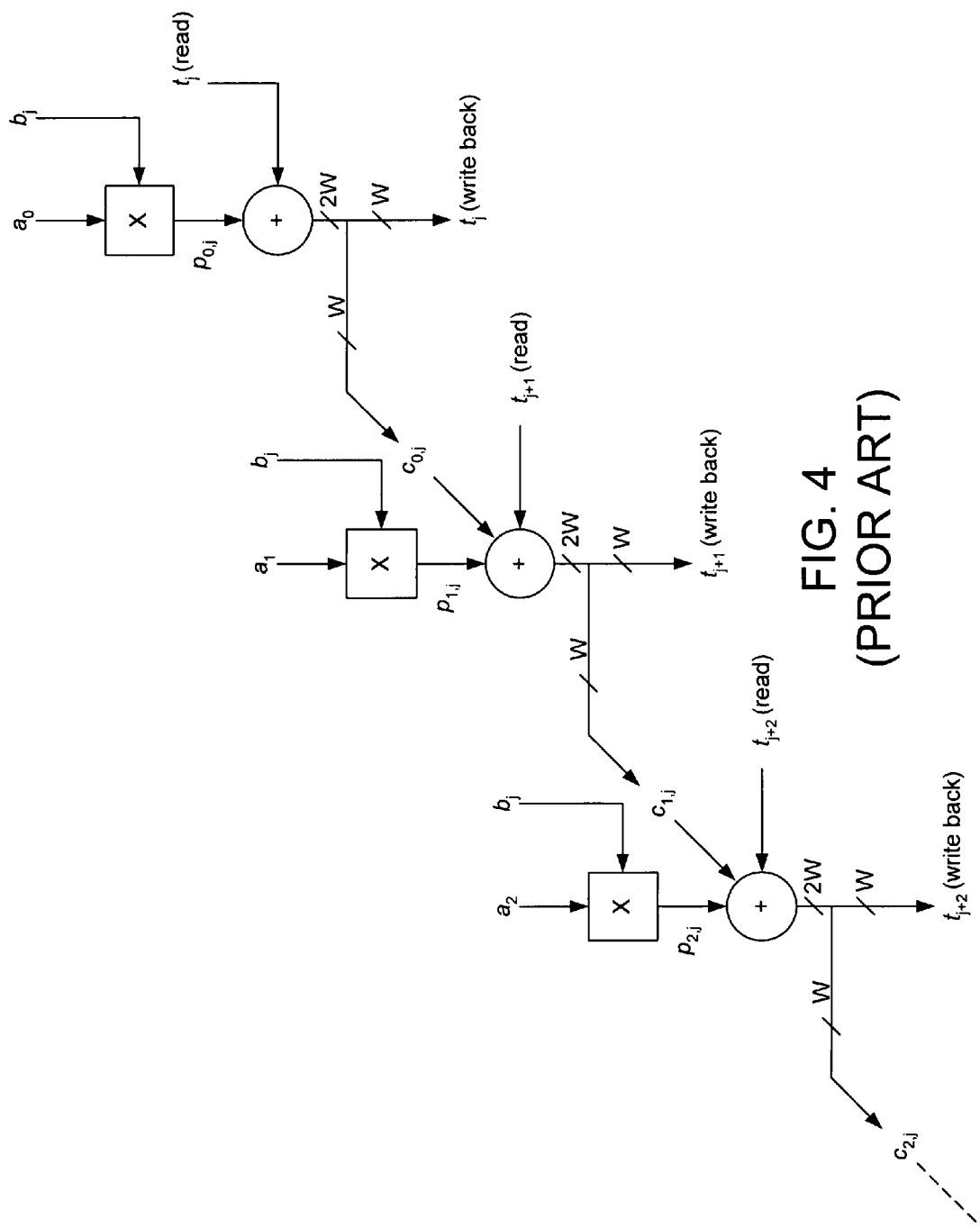
FIG. 4 is a logic diagram illustrating conventional logic of an exemplary row 301 for implementing multiplication as illustrated in FIG. 3.
Figure 5:
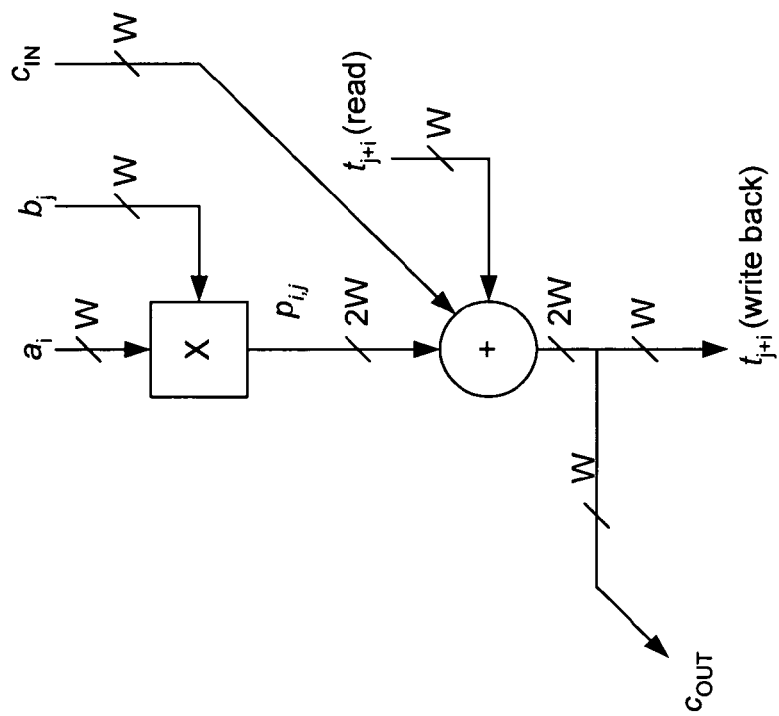
FIG. 5 is a logic diagram of a generic one of the conventional partial product generators illustrated in FIG. 4.

Operations using the new PPG take place in a right-to-left, top to bottom order, starting with the horizontal direction first as earlier-illustrated in FIG. 3.

Figure 12:
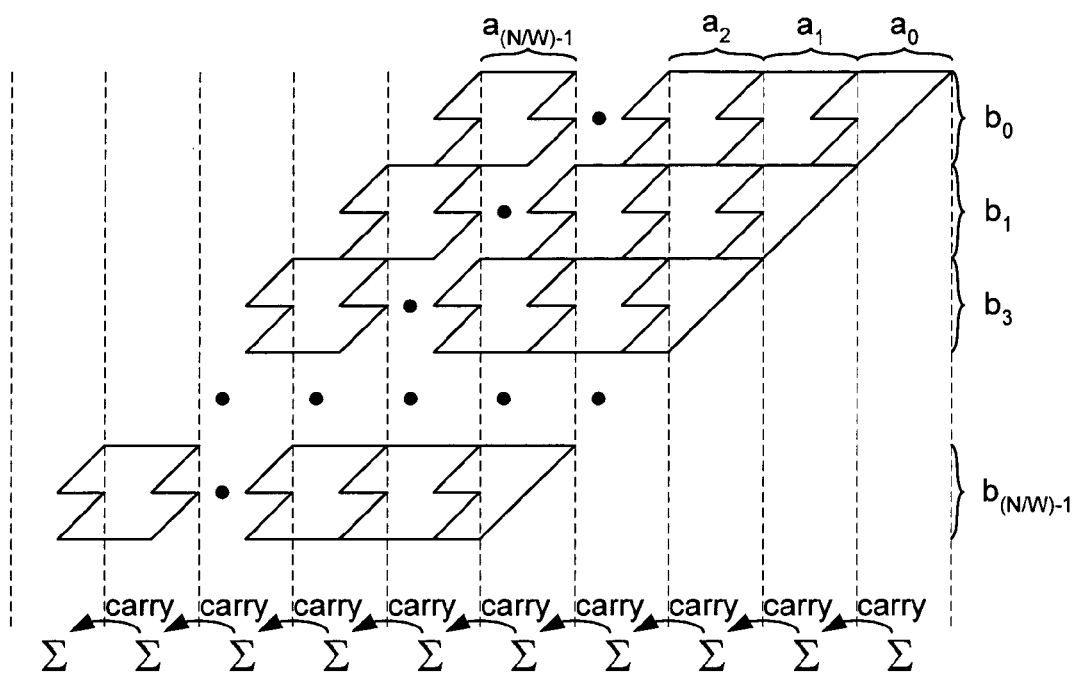
FIG. 12 is a diagram depicting how all of the required partial products are mathematically combined to generate a complete product in accordance with an aspect of the invention.

FIG. 12 is a diagram depicting how all of the required partial products are mathematically combined to generate the complete product. It is apparent from the figure that the computed result from one slice should be combined with the result from the neighboring slices to the left and right, and that these combination results are also accumulated with the values generated by the slices above and below. It can be seen in the figure that in each row, the right-most (i.e., least significant) PPG is depicted in the shape of the number "7", to indicate that only three sub-partial products are generated and accumulated within the PPG.

Figure 13:
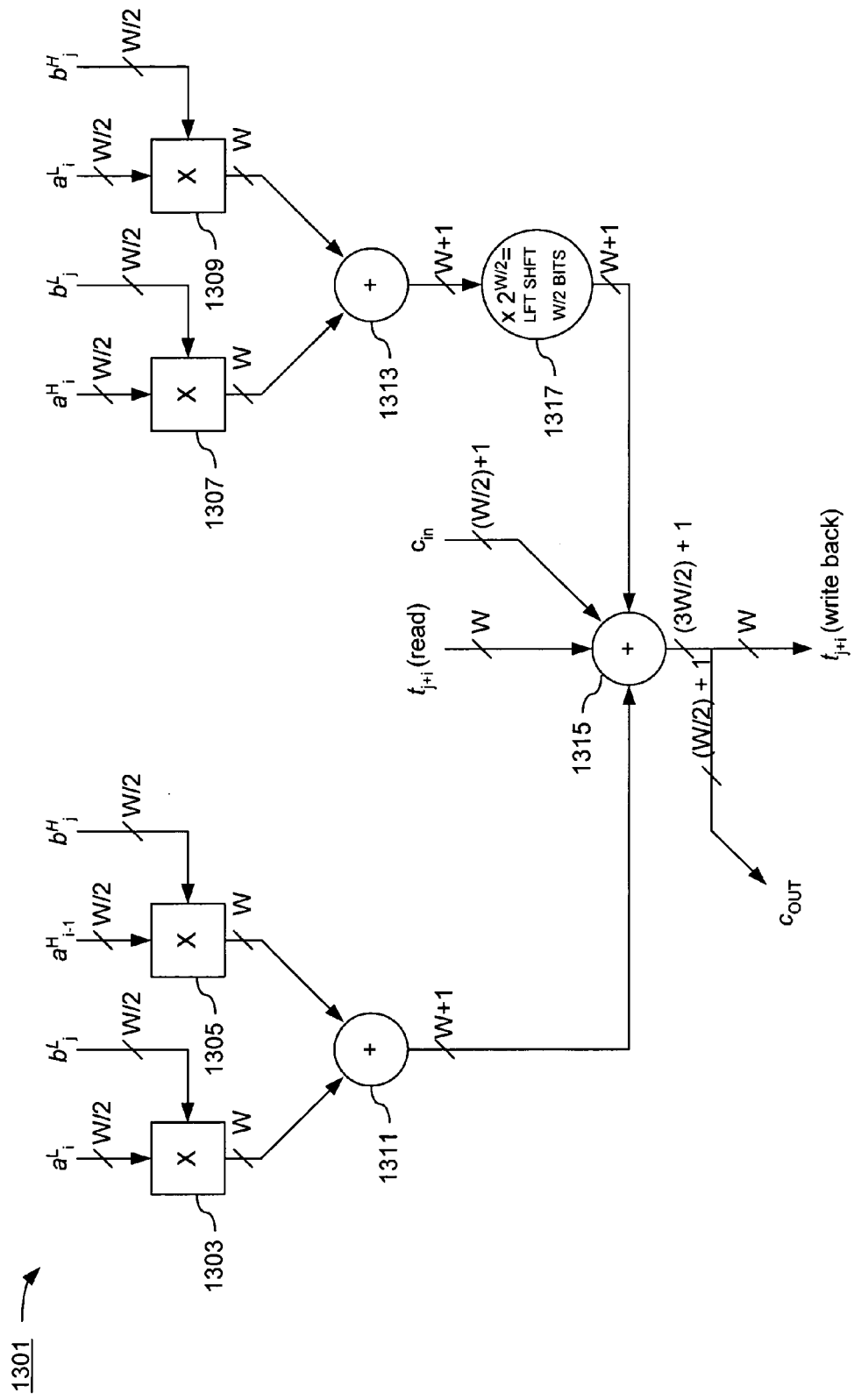
FIG. 13 is a logic diagram of an embodiment of a new partial product generator that also accumulates sub-partial products of like significance from earlier operations.

FIG. 13 is a logic diagram of an embodiment of a new PPG 1301 that also accumulates sub-partial products of like significance from earlier operations. Consequently, the output of the new PPG 1301 includes a t term rather than a p term as the lower partial product. As can be seen, this is a very compact design that utilizes only four size W/2×W/2 multipliers 1303, 1305, 1307, 1309. These multipliers 1303, 1305, 1307, 1309 are arranged, along with three adders 1311, 1313, 1315 to generate carry-out ($c_{OUT}$) and $t_{NEW}$ as follows:

$$2^W c_{OUT} + t_{NEW} = t_{OLD} + a_i^L b_j^L + a_{i-1}^H b_j^H + 2^{W/2}(a_i^H b_j^L + a_i^L b_j^H) + c_{IN},$$

where the symbols $a_i^L$, $a_i^H$ denote the lower and higher W/2 bits of $a_i$, respectively, and similar notation is used for the b variable. Additional logic 1317 is illustrated in the figure to represent scaling the output of the adder 1313 by a factor of $3^{W/2}$. However, because this is multiplication by a power of 2, it can advantageously be implemented merely by aligning the output of the adder 1313 by W/2 bits to the left (i.e., to a position of higher significance), or by performing a comparable left shift operation. Thus, it is unnecessary to use actual multiplication circuitry to accomplish this function. Also, while $t_{NEW}$ and $t_{OLD}$ may be maintained separately, in practical embodiments it is often most efficient to maintain a single value of t in storage, with $t_{OLD}$ being the value read out of storage, and $t_{NEW}$ being the value to be written back—such an embodiment is illustrated in FIG. 13.

It is possible to use the embodiment of FIG. 13 throughout the entire multiplication process if the value "0" is used for $a_{-1}^H$ whenever i=0. Alternatively, the design depicted in FIG. 13 may be modified to effect a special-case version of the PPG for use whenever i=0 (i.e., for use as the right-most—i.e., least-significant—PPGs depicted in FIG. 12). This modification involves the removal of the multiplier 1305 and the adder 1311, and supplying the output of the multiplier 1303 directly to the adder 1315.

While $t_{NEW}$ and $t_{OLD}$ may be maintained separately, in practical embodiments it is often most efficient to maintain a single value of t in storage, with $t_{OLD}$ being the value read out of storage, and $t_{NEW}$ being the value to be written back.

It will now be shown how this expression can be used to derive the maximum word length of the carry signal. Since $0 \leq a_i^H, a_i^L, a_{i-1}^H, b_j^H, b_j^L \leq 2^{W/2}-1$, it follows that:

$$a_i^H b_j^H, a_i^L b_j^H, a_i^H b_j^L, a_i^L b_j^L, a_{i-1}^H b_j^H \leq (2^{W/2}-1)^2.$$

Furthermore, the word length of t is W bits, and thus $t \leq 2^W - 1$. Thus, if we collect the carry terms on the left side of the relationship, and collect the t terms on the right side of the relationship, we find that $$2^W c_{OUT} - c_{IN} = t_{OLD} - t_{NEW} + a_i^L b_j^L + a_{i-1}^H b_j^H + 2^{W/2}(a_i^H b_j^L + a_i^L b_j^H).$$

The right side of the equation can be set to its maximum value by letting $t_{NEW}$ be set to zero (i.e., its minimum value), and by letting $t_{OLD}$ and each of the sub-partial products be set to their respective maximum values. This yields the following relationship:

$$\begin{aligned} 2^W c_{OUT} - c_{IN} &\leq (2^W - 1) + 2(2^{W/2} - 1)^2 + 2^{W/2} \times 2(2^{W/2} - 1)^2 \\ &= (2^W - 1) + 2(2^{W/2} - 1)^2(1 + 2^{W/2}) \\ &= (2^W - 1) + (2^{W/2} - 1)^2 \times 2(1 + 2^{W/2}) \\ &= (2^W - 1) + (2^W - 2^{(W/2)+1} + 1) \times 2(1 + 2^{W/2}) \\ &= (2^W - 1) + (2^W - 2^{(W/2)+1} + 1)(2 + 2^{W/2+1}) \\ &= (2^W - 1) + (2^{(3W/2)+1} - 2^{W+2} + 2^{(W/2)+1} + \\ &\quad 2^{W+1} - 2^{(W/2)+2} + 2) \\ &= 2^{(3W/2)+1} - 2^{W+2} + 2^{W+1} + \\ &\quad 2^W - 2^{(W/2)+2} + 2^{(W/2)+1} + 2 - 1 \\ &< 2^{(3W/2)+1} \end{aligned}$$

Since $c_{IN}$ is, by definition, greater than or equal to zero, and since the relationship must be true for all values of $c_{IN}$ (i.e., including $c_{IN}=0$), it can be concluded that $c_{OUT} < 2^{(W/2)+1}$. Furthermore, the word length of the carry in signal is the same as the carry out signal. Therefore, $$c_{IN}, c_{OUT} < 2^{(W/2)+1}.$$

That is, the intermediate right-to-left propagating carry for the partial product generator 201 is only half the size of the conventional approach plus one bit.

The gain from using the new split-radix multiplication method compared to the conventional technique can also be computed. Assume the word length is W bits. The conventional approach to partial product generation utilizes W×W multipliers. This results in a carry propagate chain of 2W adder cells. For the new split radix multiplier, the corresponding number of cells is W+W/2+1 Thus, the carry chain is reduced by a factor $$\text{carry chain reduction} = 1 - \frac{W + W/2 + 1}{2W} = \frac{1}{4} - \frac{1}{2W},$$

that is, approaching 25% for large values of W. Two examples of realistic scenarios are:

Example 1: 16×16 bit partial product. Reduction is 21.9%
Example 2: 32×32 bit partial product. Reduction is 23.4%.

For multipliers and adders, the carry propagate chain is equal to the critical path. Therefore, a shorter carry chain implies an implementation of lower cost in terms of delay, area, and power consumption.

It is not possible to make a general statement about the exact magnitude of the gain because of the wide range of different multiplication and addition schemes. However, for the common ripple-carry addition scheme, often used in multipliers, the reduced carry chain implies linear reduction in delay and area, and linear or even polynomic improvement in energy per operation.

The new split radix multiplication scheme can be further optimized by using distributed arithmetic and offset binary coding, as described in A. Croisier et al., U.S. Pat. No. 3,777,130, entitled "Digital filter for PCM encoded signals" (issued December 1973); A. Peled and B. Liu, "A new hardware realization of digital filter," *IEEE Transactions on Acoustics, Speech, and Signal Processing*, vol. ASSP-22, no. 6, December 1974; and A. Berkeman et al., "A low logic depth complex multiplier using distributed arithmetic," *IEEE Journal of Solid-State Circuits*, vol. 35, no. 4, pp. 656-659, April 2000, each of which is hereby incorporated herein by reference. Where the $a_i$ signals are offset binary coded, the $b_j$ signals may be recoded as follows:

$$\begin{cases} b_j^\sigma = b_j^L + b_j^H \\ b_j^\delta = b_j^L - b_j^H \end{cases}.$$

The following identities are also utilized:

$$a_i^L b_j^L + a_i^H b_j^L = F(a_i^L, a_i^H, b_j^\sigma, b_j^\delta),$$

$$a_{i-1}^H b_j^H + a_i^L b_j^H = F(a_{i-1}^H, a_i^L, b_j^\sigma, b_j^\delta)$$

where the F( )-function denotes a second order distributed arithmetic multiplier with offset binary encoded input signals. Further information about this may be found in A. Berkeman and V. Öwall, "Co-Optimization of FFT and FIR in a Delayless Acoustic Echo Canceller Implementation," *Proceedings of ISCAS* 2000, Geneva, Switzerland, May 2000. With this construction, the number of partial product bits for the four W/2-sized multipliers are reduced to approximately one half, with a corresponding decrease in the number of required adders in the multipliers. The recoding of the b-signals can be implemented either prior to the multiplication operation, or in the right-most partial product generator stage. A further advantage with the distributed arithmetic multipliers is that the adder 1315 with four inputs as shown in FIG. 13 is replaced by a more efficient three word input adder.

In yet another aspect of the invention, Montgomery's method of operating on data divided into words of W bits can be implemented in an algorithm that computes the product $$p = abr^{-1} \mod n,$$

where $r = 2^{DW}$ is constant. The algorithm is as follows:

```
1:  n0' ← (-n⁻¹) mod 2^W
2:  t ← 0
3:  for i = 0 to D - 1 do
4:    c ← 0
5:    for j = 0 to D - 1 do
6:      if j = 0 then
7:        mi ← (t0 + a0bi)n0' mod 2^W
```

-continued

```
 8:    end if
 9:    2^W c + t_j ← t_j + a_j b_i + n_j m_i + c
10:    end for
11:    t ← t/2^W
12: end for
13: if t ≥ n then
14:    p ← t - n
15: else
16:    p ← t
17: end if
```

For each iteration of the loop variable i, the least significant W bits are set to zero and the partial result is shifted W bits to the right.

Figure 14:
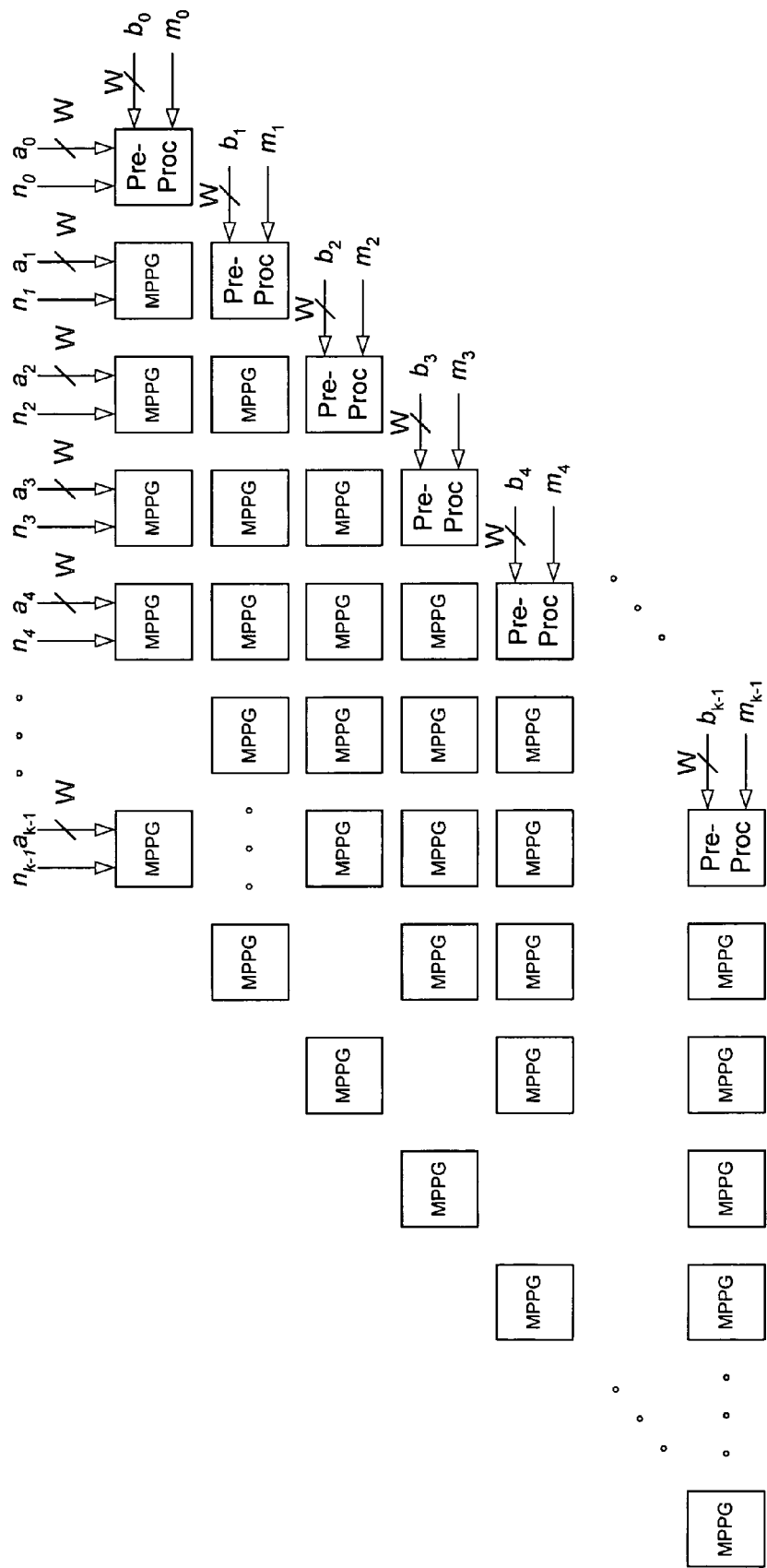
FIG. 14 illustrates the division of the input words into W×W blocks that the algorithm works on, in accordance with an aspect of the invention.

FIG. 14 illustrates the division of the input words into W×W blocks that the algorithm works on. There are two different kinds of blocks: right-most (i.e., least significant) preprocessing blocks (identified by "pre-proc" in the figure) that perform the zeroing of the least significant word according to lines 6-9 of the algorithm; and "standard" Montgomery blocks (identified by "MPPG" in the figure) that compute only line 9 of the algorithm. The standard Montgomery blocks dominate the complexity of the algorithm.

Figure 15:
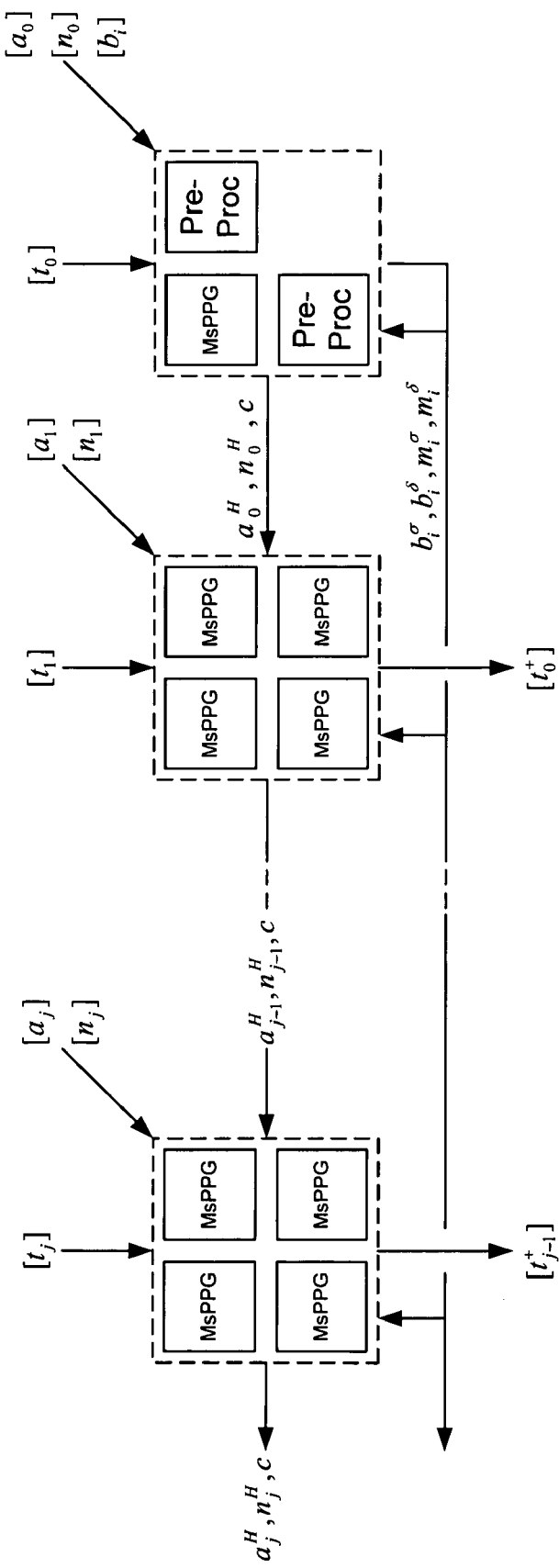
FIG. 15 illustrates how a split radix Montgomery algorithm is created, in accordance with an aspect of the invention, by dividing all computing blocks of FIG. 14 into sub-blocks containing three or four radix-$2^{W/2}$ blocks.

The split radix Montgomery algorithm is created by dividing all computing blocks of FIG. 14 into sub-blocks, containing three or four radix-$2^{W/2}$ blocks (identified as "MsPPG" in the figure) as illustrated in FIG. 15. In the figure, the square brackets indicate that the designated data has to be read from or written to a memory. Other variables are passed between the consecutive steps and stored intermediately.

Using the notation $\tilde{n} = n'_0 \mod 2^{W/2}$, and $a_j^L$, $a_j^H$ are the least and most significant W/2 bits of $a_j$, and so forth, the rightmost blocks of FIG. 15 compute the following operations:

MemRead: $t=t_0$, $a=a_0$, $n=n_0$, $b=b_i$

1: $(2^{W/2} c_0 + s_0) \leftarrow t^L + a^L b^L$

2: $m^L \leftarrow s_0 \tilde{n} \mod 2^{W/2}$

3: $(2^{W/2} c_0 + s_0) \leftarrow (2^{W/2} c_0 + s_0) + n^L m^L$

4: $(2^{W/2} c_1 + s_1) \leftarrow t^H + a^H b^L + a^L b^H + n^H m^L + c_0$

5: $m^H \leftarrow s_1 \tilde{n} \mod 2^{W/2}$

6: $(2^{W/2} c_1 + s_1) \leftarrow (2^{W/2} c_1 + s_1) + n^L m^H$ thereby zeroing the least W bits (corresponding to $t^H$ and $t^L$) and feeding a carry $c = c_1$, and the signals b and m to the next step. The remaining blocks then compute:

MemRead: $t=t_j$, $a=a_j$, $n=n_j$, c

1: $(2^{W/2} c_0 + s_0) \leftarrow t^L + a^L b^L + a^H b^H + n^L m^L + n^H m^H + c$ 2: $(2^{W/2} c_1 + s_1) \leftarrow t^H + a^H b^L + a^L b^H + n^H m^L + n^L m^H + c_0$ MemWrite: $t_{i-1} = 2^{W/2} s_1 + s_0$ Between the blocks, a carry $c=c_1$ is propagated, as well as the values that are shared and propagated: $a'^H = a_{j-1}^H$, $n'^H = n_{j-1}^H$, $b_i$, and $m_i$.

Looking again at the operations performed in the non-rightmost blocks in FIG. 14, it can be seen that eight W/2×W/2 multiplications are required. One W×W multiplier is equivalent to four W/2×W/2 multipliers in terms of the number of partial product bits, but as seen before in the general case, the reordering shortens the length of the carry chain, and reduces the word length of the intermediate carry signal.

Applying distributed arithmetic and offset binary coding, denote $$\begin{cases} b_i^\sigma = b_i^H + b_i^L \\ b_i^\delta = b_i^H - b_i^L \end{cases}$$

and $$\begin{cases} m_i^\sigma = m_i^H + m_i^L \\ m_i^\delta = m_i^H - m_i^L \end{cases}.$$

Then, the scalar products can be written more efficiently as $a^L b^L + a'^H b^H = F(a^L, a'^H, b_\sigma, b_\delta)$ $n^L m^L + n'^H m^H = F(n^L, n'^H, m_\sigma, m_\delta)$ $a^H b^L + a^L b^H = F(a^H, a^L, b_\sigma, b_\delta)$ $n^H m^L + n^L m^H = F(n^H, n^L, m_\sigma, m_\delta)$ where the F-function denotes a distributed arithmetic multiplier as before.

A further optimization step is found by generating all of the sums and differences of $b_\sigma$, $b_\delta$, $m_\sigma$, and $m_\delta$; in total 16 combinations. Actually, only half of them need be generated because the other half have the same absolute value but opposite sign. Now, only hardware corresponding to one size W/2×W/2 multiplier plus some multiplexers is required for the implementation, and the memory addressing scheme still remains the same.

The above-described strategy for multiplying numbers together has advantageous properties, including but not limited to the following:

1. The same addressing and word lengths are used as in the conventional approach. That is, since the input/output data word length is kept at W bits, the same number of partial products is generated as in the conventional approach, and accessing of data remains the same.

2. The carry propagate chain is shortened from 2W bits to 3W/2+2 bits. Having a shorter carry propagate chain means that the calculation and addition of a partial product will be faster than in the conventional approach. Furthermore, switching activity is reduced, and energy consumption is lower.

3. The intermediate carry signal is shortened from W bits to W/2+1 bits. Thus, fewer bits have to be propagated and added from one slice to a following slice. This helps increase speed and reduce energy consumption due to less switching activity.

4. The only additional requirement is intermediate forwarding of the W/2 bits of $a_{j-1}^H$.

5. The required hardware area for implementation of the new multiplication strategy will be the same or less than that required for the conventional approach due to the reduced word length of the carry signals.

6. Modified Booth encoding and similar devices are still applicable to the radix-$2^{W/2}$ multipliers, further reducing delay and area.

7. Distributed arithmetic and offset binary coding is an efficient means to reduce speed and area of the split radix partial product generator.

8. Applications include efficient calculation of Montgomery multiplication, for use in, for example, cryptographic applications.

9. Applications, including cryptographic applications, may use the split-radix multiplication techniques "as is" (i.e., outside the context of Montgomery multiplication).

The invention has been described with reference to a particular embodiment. However, it will be readily apparent to those skilled in the art that it is possible to embody the invention in specific forms other than those of the preferred embodiment described above. This may be done without departing from the spirit of the invention.

For example, an embodiment was described above with respect to FIG. 13 in which a new PPG 1301 also accumulates sub-partial products of like significance from earlier operations. However, in alternative embodiments, it is possible for each PPG to merely generate $$2^W c_{OUT} + p_i = a_i^L b_j^L + a_{i-1}^H b_j^H + 2^{W/2}(a_i^H b_j^L + a_i^L b_j^H) + c_{IN},$$

where $p_i$ is a W-bit wide lower partial product. In this embodiment, the accumulation is performed separately in one or more subsequent steps.

Also, the invention has been described in the context of multiplying two numbers together. However, it will be readily apparent that the same principles of split-radix multiplication may be applied to perform multiplication between more than two numbers. In such cases, sub-partial products are formed from the various operands and combined in the manner described above.

Thus, the preferred embodiment is merely illustrative and should not be considered restrictive in anyway. The scope of the invention is given by the appended claims, rather than the preceding description, and all variations and equivalents that fall within the range of the claims are intended to be embraced therein.

What is claimed is:

1. An apparatus for multiplying a first number by a second number, the apparatus comprising:
   first representation circuitry that represents the first number as a first set of two or more W-bit wide numbers, wherein W is an integer greater than or equal to 2;
   second representation circuitry that represents the second number as a second set of one or more W-bit wide numbers;
   pairing circuitry that pairs each of the W-bit wide numbers from the first set with each of the W-bit wide numbers from the second set;
   sub-partial product generation circuitry that generates a set of sub-partial products for each pair of W-bit wide numbers;
   combination forming circuitry that forms combinations of the sub-partial products such that each combination is representable by a W-bit wide lower partial product and a carry out term that has fewer than W bits; and
   combining circuitry that combines the W-bit wide lower partial products and the carry out terms to form the product of the first number and the second number.

2. The apparatus of claim 1, wherein each of the carry out terms is representable by (W/2)+1 bits, wherein W is an even number.

3. The apparatus of claim 2, wherein:
   the first number is representable by N bits $N \geq 2$;
   the second number is representable by M bits, $M \geq 2$;
   for each pair of W-bit wide numbers, $(a_i, b_j)$, $$a_i = a_i^H 2^{W/2} + a_i^L \text{ and } b_j = b_j^H 2^{W/2} + b_j^L,$$

where $a_i^H$, $a_i^L$, $b_j^H$, $b_j^L$ are each W/2-bit wide numbers, $0 \leq i \leq N/W-1$, and $0 \leq j \leq M/W-1$; and
   the combination forming circuitry forms each of the combinations of the sub-partial products in accordance with:

$$2^W c_{OUT} + p_i = a_i^L b_j^L + a_{i-1}^H b_j^H + 2^{W/2}(a_i^H b_j^L + a_i^L b_j^H) + c_{IN},$$

where $p_i$ is a W-bit wide lower partial product, $c_{IN}$ is a (W/2)+1 bit wide carry-in term, $c_{OUT}$ is a (W/2)+1 bit wide carry-out term, and $a_{i-1}^H = 0$ when $i=0$.

4. The apparatus of claim 3, comprising:
   logic that uses offset binary coding to represent $a_i$;
   logic that represents $b_j$ in accordance with $$\begin{cases} b_j^\sigma = b_j^L + b_j^H \\ b_j^\delta = b_j^L - b_j^H \end{cases};$$

and
   logic that uses logic functions of bits of $a_i$ to select either $b_j^\sigma$ or $b_j^\delta$ in forming each of the combinations of the sub-partial products.

5. The apparatus of claim 2, wherein:
   the first number is representable by N bits $N \geq 2$;
   the second number is representable by M bits, $M \geq 2$;
   for each pair of W-bit wide numbers, $(a_i, b_j)$, $$a_i = a_i^H 2^{W/2} + a_i^L \text{ and } b_j = b_j^H 2^{W/2} + b_j^L,$$

where $a_i^H$, $a_i^L$, $b_j^H$, $b_j^L$ are each W/2-bit wide numbers, $0 \leq i \leq N/W-1$, and $0 \leq j \leq M/W-1$; and
   the combination forming circuitry forms each of the combinations of the sub-partial products in accordance with:

$$2^W c_{OUT} + t_{NEW} = t_{OLD} + a_i^L b_j^L + a_{i-1}^H b_j^H + 2^{W/2}(a_i^H b_j^L + a_i^L b_j^H) + c_{IN}$$

where $t_{OLD}$ is a W-bit wide term representing an accumulation of previously generated lower partial products and carry terms, $t_{NEW}$ is a W-bit wide term representing a new accumulation of previously and presently generated lower partial products and carry terms, $c_{IN}$ is a (W/2)+1 bit wide carry-in term, $c_{OUT}$ is a (W/2)+1 bit wide carry-out term, and $a_{i-1}^H = 0$ when $i=0$.

6. The apparatus of claim 5, comprising:
   logic that uses offset binary coding to represent $a_i$;
   logic that represents $b_j$ in accordance with $$\begin{cases} b_j^\sigma = b_j^L + b_j^H \\ b_j^\delta = b_j^L - b_j^H \end{cases};$$

and
   logic that uses logic functions of bits of $a_i$ to select either $b_j^\sigma$ or $b_j^\delta$ in forming each of the combinations of the sub-partial products.

7. A partial product generator for use in multiplying a first number by a second number, wherein the first number is represented as a first set of two or more W-bit wide numbers, and the second number is represented as a second set of one or more W-bit wide numbers, the apparatus comprising:

first receiving circuitry that receives a first W-bit wide number from the first set of two or more W-bit wide numbers, wherein W is an integer greater than or equal to 2;

second receiving circuitry that receives a second W-bit wide number from the second set of one or more W-bit wide numbers;

sub-partial product generation circuitry that uses the first W-bit wide number and the second W-bit wide number to generate a set of sub-partial products; and combination forming circuitry that forms combinations of the sub-partial products such that each combination is representable by a W-bit wide lower partial product and a carry out term that has fewer than W bits.

8. The partial product generator of claim 7, wherein each of the carry out terms is representable by (W/2)+1 bits, wherein W is an even number.

9. The partial product generator of claim 8, wherein:
the first number is representable by N bits $N \geq 2$;
the second number is representable by M bits, $M \geq 2$;
for each pair of W-bit wide numbers, $(a_i, b_j)$, that are input into the partial product generator, $$a_i = a_i^H 2^{W/2} + a_i^L \text{ and } b_j = b_j^H 2^{W/2} + b_j^L,$$

where $a_i^H$, $a_i^L$, $b_j^H$, $b_j^L$ are each W/2-bit wide numbers, $0 \leq i \leq N/W-1$, and $0 \leq j \leq M/W-1$; and the combination forming circuitry forms each of the combinations of the sub-partial products in accordance with:

$$2^W c_{OUT} + p_i = a_i^L b_j^L + a_{i-1}^H b_j^H + 2^{W/2}(a_i^H b_j^L + a_i^L b_j^H) + c_{IN},$$

where $p_i$ is a W-bit wide lower partial product, $c_{IN}$ is a (W/2)+1 bit wide carry-in term, $c_{OUT}$ is a (W/2)+1 bit wide carry-out term, and $a_{i-1}^H = 0$ when $i=0$.

10. The partial product generator of claim 9, comprising:
logic that uses offset binary coding to represent $a_i$;
logic that represents $b_j$ in accordance with $$\begin{cases} b_j^\sigma = b_j^L + b_j^H \\ b_j^\delta = b_j^L - b_j^H \end{cases};$$

and logic that uses logic functions of bits of $a_i$ to select either $b_j^\sigma$ or $b_j^\delta$ in forming each of the combinations of the sub-partial products.

11. The partial product generator of claim 8, wherein:
the first number is representable by N bits $N \geq 2$;
the second number is representable by M bits, $M \geq 2$;
for each pair of W-bit wide numbers, $(a_i, b_j)$, that are input into the partial product generator, $$a_i = a_i^H 2^{W/2} + a_i^L \text{ and } b_j = b_j^H 2^{W/2} + b_j^L,$$

where $a_i^H$, $a_i^L$, $b_j^H$, $b_j^L$ are each W/2-bit wide numbers, $0 \leq i \leq N/W-1$, and $0 \leq j \leq M/W-1$; and the combination forming circuitry forms each of the combinations of the sub-partial products in accordance with:

$$2^W c_{OUT} + t_{NEW} = t_{OLD} + a_i^L b_j^L + a_{i-1}^H b_j^H + 2^{W/2}(a_i^H b_j^L + a_i^L b_j^H) + c_{IN},$$

where $t_{OLD}$ is a W-bit wide term representing an accumulation of previously generated lower partial products and carry terms, $t_{NEW}$ is a W-bit wide term representing a new accumulation of previously and presently generated lower partial products and carry terms, $c_{IN}$ is a (W/2)+1 bit wide carry-in term, $c_{OUT}$ is a (W/2)+1 bit wide carry-out term, and $a_{i-1}^H = 0$ when $i=0$.

12. The partial product generator of claim 11, comprising:
logic that uses offset binary coding to represent $a_i$;
logic that represents $b_j$ in accordance with $$\begin{cases} b_j^\sigma = b_j^L + b_j^H \\ b_j^\delta = b_j^L - b_j^H \end{cases};$$

and logic that uses logic functions of bits of $a_i$ to select either $b_j^\sigma$ or $b_j^\delta$ in forming each of the combinations of the sub-partial products.

13. An apparatus for performing Montgomery multiplication between a first number and a second number, wherein the first number is represented as a first set of two or more W-bit wide numbers, and the second number is represented as a second set of one or more W-bit wide numbers, the apparatus comprising:

first number input circuitry that receives a first W-bit wide number from the first set of two or more W-bit wide numbers, wherein W is an integer greater than or equal to 2;

second number input circuitry that receives a second W-bit wide number from the second set of one or more W-bit wide numbers;

sub-partial product generation circuitry that uses the first W-bit wide number and the second W-bit wide number to generate a set of sub-partial products; and combination forming circuitry that forms combinations of the sub-partial products such that each combination is representable by a W-bit wide lower partial product and a carry out term that has fewer than W bits.

* * * * *

UNITED STATES PATENT AND TRADEMARK OFFICE
CERTIFICATE OF CORRECTION

PATENT NO. : 7,318,080 B2
APPLICATION NO. : 10/701634
DATED : January 8, 2008
INVENTOR(S) : Berkeman It is certified that error appears in the above-identified patent and that said Letters Patent is hereby corrected as shown below:

In Column 1, Line 40, delete "width" and insert -- with --, therefor.

In Column 3, Line 5, delete "tk" and insert -- $t_k$ --, therefor.

In Column 8, Line 1, delete "$x^{i,j}$" and insert -- $x_{i,j}$ --, therefor.

In Column 8, Line 21, delete "$a_1=a_i^H 2^{W/2}+a_i^L$" and insert -- $a_i=a_i^H 2^{W/2}+a_i^L$ --, therefor.

In Column 8, Line 22, delete "$b_j=b_j^H 2^{W/2}+b_j^L$." and insert -- $b_j=b_j^H 2^{W/2}+b_j^L$. --, therefor.

In Column 10, Line 44, delete "$3^{W/2}$." and insert -- $2^{W/2}$. --, therefor.

In Column 10, Line 57, delete "$a_{-1}^H$" and insert -- $a^H_{i-1}$ --, therefor.

In Column 13, Line 60, delete "$s_1+S_0$" and insert -- $s_1+s_0$ --, therefor.

In Column 14, Lines 21-27, delete "
$$a^L b^L + a'^H b^H = F(a^L, a'^H, b_\sigma, b_\delta)$$
$$n^L m^L + n'^H m^H = F(n^L, n'^H, m_\sigma, m_\delta)$$
$$a^H b^L + a^L b^H = F(a^H, a^L, b_\sigma, b_\delta)$$
" and $$a^L b^L + a'^H b^H = F(a^L, a'^H, b_\sigma, b_\delta)$$
$$n^L m^L + n'^H m^H = F(n^L, n'^H, m_\sigma, m_\delta)$$
$$a^H b^L + a^L b^H = F(a^H, a^L, b_\sigma, b_\delta)$$
insert -- $n^H m^L + n^L m^H = F(n^H, n^L, m_\sigma, m_\delta)$ --, therefor.

In Column 16, Line 35, in Claim 5, delete "$a_i^L$," and insert -- $a_i^L$, --, therefor.

UNITED STATES PATENT AND TRADEMARK OFFICE
CERTIFICATE OF CORRECTION

PATENT NO. : 7,318,080 B2
APPLICATION NO. : 10/701634
DATED : January 8, 2008
INVENTOR(S) : Berkeman It is certified that error appears in the above-identified patent and that said Letters Patent is hereby corrected as shown below:

In Column 17, Line 30, in Claim 9, delete " $2^W c_{OUT} + p_i = a_i^L b_j^L + a_{i-1}^H b_j^H + 2^{W/2}(a_i^H b_j^L + a_i^L b_j^H) + c_{IN},$ " and insert -- $2^W c_{OUT} + p_i = a_i^L b_j^L + a_{i-1}^H b_j^H + 2^{W/2}(a_i^H b_j^L + a_i^L b_j^H) + c_{IN},$ --, therefor.

Signed and Sealed this

Fourteenth Day of October, 2008

JON W. DUDAS
*Director of the United States Patent and Trademark Office*